United States Patent
Heinz et al.

(10) Patent No.: US 6,305,512 B1
(45) Date of Patent: Oct. 23, 2001

(54) VALVE WHICH REACTS AS A FUNCTION OF PRESSURE, ESPECIALLY FOR A VIBRATION DAMPER

(75) Inventors: Norbert Heinz, Üchtelhausen; Joachim Kühnel, Dittelbrunn; Thomas Kutsche, Schweinfurt; Thomas Manger, Wasserlosen-Kaisten; Thorsten Assiioff, Schweinfurt; Steffen Heyn, Schweinfurt; Alfred Wirth, Schweinfurt, all of (DE)

(73) Assignee: Mannesmann Sachs AG, Schweinfurt (DE)

( * ) Notice: Subject to any disclaimer, the term of this patent is extended or adjusted under 35 U.S.C. 154(b) by 0 days.

(21) Appl. No.: 09/626,567

(22) Filed: Jul. 27, 2000

(30) Foreign Application Priority Data

Jul. 27, 1999 (DE) .............................. 199 34 470

(51) Int. Cl.⁷ ...................................... F16F 9/46
(52) U.S. Cl. ..................... 188/299.1; 188/266.6
(58) Field of Search .............................. 188/266.6, 299.1, 188/322.13

(56) References Cited

U.S. PATENT DOCUMENTS

| | | |
|---|---|---|
| 4,650,042 | 3/1987 | Knecht et al. . |
| 4,880,086 * | 11/1989 | Knecht et al. .................. 188/322.13 |
| 5,335,757 | 8/1994 | Knecht et al. . |
| 5,392,885 * | 2/1995 | Patzenhauer et al. .......... 188/322.13 |
| 5,431,259 * | 7/1995 | Mizutani et al. ................. 188/322.13 |
| 5,472,072 | 12/1995 | Bumgarner . |
| 5,960,915 * | 10/1999 | Nezu et al. ....................... 188/266.6 |
| 6,079,526 * | 6/2000 | Nezu et al. ....................... 188/266.6 |
| 6,182,687 * | 2/2001 | Forster et al. .................... 188/299.1 |
| 6,182,805 * | 2/2001 | Kashiwagi et al. .............. 188/266.6 |

FOREIGN PATENT DOCUMENTS

| | | |
|---|---|---|
| 1 041 742 | 4/1959 | (DE) . |
| 70 47 641 | 12/1970 | (DE) . |
| 34 34 877 | 4/1988 | (DE) . |
| 41 05 771 | 8/1992 | (DE) . |
| 42 33 319 | 4/1994 | (DE) . |
| 44 01 393 | 4/1995 | (DE) . |
| 44 27 559 | 8/1995 | (DE) . |
| 691 20 008 | 12/1996 | (DE) . |

* cited by examiner

Primary Examiner—Christopher P. Schwartz
(74) Attorney, Agent, or Firm—Cohen, Pontani, Lieberman & Pavane

(57) ABSTRACT

A pressure operated valve is provided including an adjusting device, a spring and a vent connection. The adjusting device is axially movably arranged in a pressure chamber defined in the valve and comprises a valve body and a pressure intensifier. A space between the valve body and valve face defines a valve passage cross section. The spring is operatively arranged for holding the pressure intensifier in a floating arrangement in the pressure chamber. The pressure intensifier has a first side exposed to a pressure in the pressure connection opening and a second side facing away from the pressure connection opening. The second side of the pressure intensifier and the adjusting device define a low pressure chamber within the pressure chamber. The vent connection is an inflow restrictor arranged between the lower pressure chamber and a space having a lower pressure than the low pressure chamber.

16 Claims, 3 Drawing Sheets

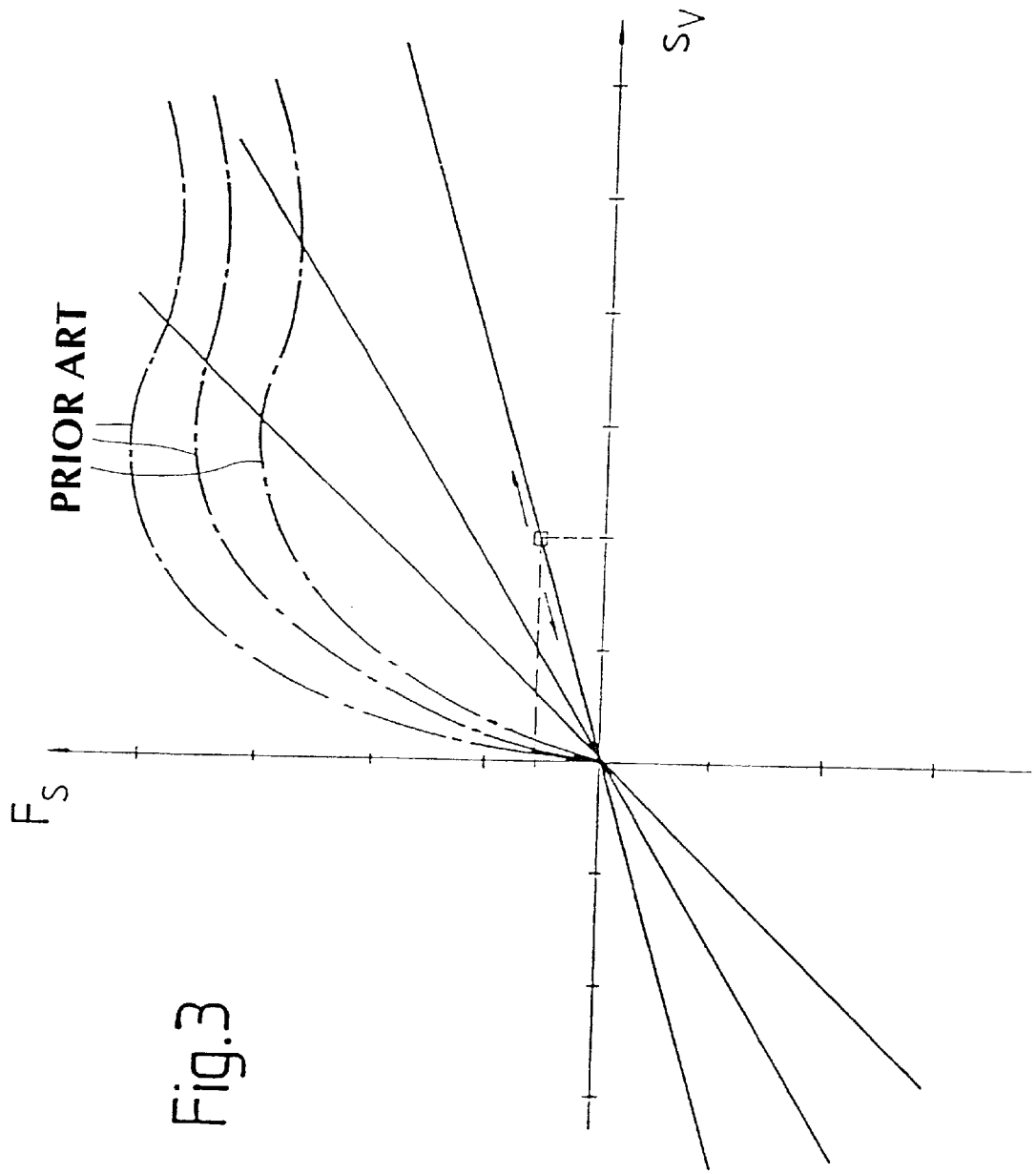

VALVE WHICH REACTS AS A FUNCTION OF PRESSURE, ESPECIALLY FOR A VIBRATION DAMPER

BACKGROUND OF THE INVENTION

1. Field of the Invention

The invention relates to a valve having a pressure dependent reaction.

2. Description of the Related Art

A valve that reacts as a function of pressure for an adjustable vibration damper is disclosed in DE 44 01 393 C1 and comprises a piston rod axially movably arranged in a cylindrical tube filled with damping liquid. The cylindrical tube has a connection to the pressure-dependent valve, which is driven by an adjusting device to which pressure is applied, the adjusting device having a valve body which is axially movable and is driven by a pressure intensifier mounted so as to float in a pressure chamber. The pressure intensifier is supported by at least one spring which prestresses the pressure intensifier and determines the steepness of an opening characteristic of said valve at given valve cross sections. One problem is that it is necessary to effectively prevent any leak at the pressure intensifier, originating from the pressure connection, that can cause maladjustment of the valve.

In addition, this known valve has a relatively high thermal load. Therefore, the compressed-air feed to the valve may be achieved only with a relatively high constructional outlay, since commercially available plastic hoses would scorch under the high thermal load. Metal tubes cannot be used, or can be used only under certain conditions, in the application of the valve to a vibration damper, since the vibration damper executes relatively large springing movements, which load the metal tube.

SUMMARY OF THE INVENTION

The object of the present invention is to develop a pressure dependent valve so that the aforementioned leaks do not have any adverse effect on the action of the valve, while reducing thermal loading of the components of the valve.

Briefly stated, the present invention comprises a pressure operated valve including an adjusting device, a spring and a vent connection. The adjusting device is axially movably arranged in a pressure chamber defined in the valve and comprises a valve body and a pressure intensifier. A space between the valve body and valve face defines a valve passage cross section. The spring is operatively arranged for holding the pressure intensifier in a floating arrangement in the pressure chamber. The pressure intensifier has a first side exposed to a pressure in the pressure connection opening and a second side facing away from the pressure connection opening. The second side of the pressure intensifier adjoins a low pressure chamber within the pressure chamber. The vent connection is an inflow restrictor arranged between the lower pressure chamber and a space having a lower pressure than the low pressure chamber.

According to the invention, the object related to leaks is achieved by the pressure intensifier. On the side of the pressure intensifier facing away from the pressure connection opening, adjoining a low-pressure chamber, is a vent connection to a still lower pressure level, the vent connection being at least partly covered by an inflow restrictor.

Although the inflow restrictor permits compressed air which flows into the low-pressure chamber as leakage air to escape from the latter and ensures that no compressive force builds up on the intensifier in the low-pressure chamber, it is nevertheless impossible for spray water or dust to penetrate unimpeded into the valve.

Provision is therefore made for the inflow restrictor to be formed by a cap. The cap forms a shield which, for example, leaves only a radial outflow direction free for the escaping leakage air.

According to an advantageous embodiment, the low-pressure chamber is defined by an insert, in which the pressure intensifier is guided so as to move axially, the insert being arranged in a tubular connecting piece that accommodates the entire valve, and the vent connection extending in sections from the low-pressure chamber through the walls of the insert and of the tubular connecting piece.

With regard to the required functional reliability, the insert has an installation orientation marking, for sections of the vent connection in the tubular connecting piece and in the insert form to overlap.

For this purpose, the tubular connecting piece has an anti-rotation device which is aligned radially inward toward the insert and engages in the installation orientation marking.

To maintain reasonable production costs of the installation orientation mark, the anti-rotation device is formed by a pin that passes through the tubular connecting piece. In a second function, the pin is used to fix the inflow restrictor designed as a cap.

In a further embodiment, the installation orientation marking is formed by an axial groove. This provides the advantage that the pin with the cap can already be fixed to the tubular connecting piece, and the insert in the tubular connecting piece comes to rest on the inner end of the pin until, as a result of rotation of the insert, the pin can engage in the axial groove in the insert and hence fix the insert in the circumferential direction. A pin can be formed by a screw, a rivet or else a notched nail or any other desired element that passes through the wall of the tubular connecting piece.

In order for condensed moisture or moisture which has penetrated in spite of the inflow restrictor to flow out of the valve, the vent connection for the compressed air, with respect to the installation position of the tubular connecting piece, is arranged at least in the vicinity of the lowest point. In addition, the insert has a base with a wall that widens like a funnel, so that no residual moisture can remain in the valve.

The object with respect to the heat problem is achieved by the pressure connection having a thermal insulator with respect to the further valve components.

This makes it possible for a simple plastic hose and also a plastic connecting element to be used for the pressure supply, which has only a low thermal resistance but is permanently elastic.

In a further advantageous embodiment, the insulator is formed by a cover that closes the valve. It has been shown to be particularly advantageous for the cover to consist of a polymer.

In order that the cover also withstands relatively high control pressures, the cover is fixed by a cover securing ring. The cover securing ring covers the cover over a large area and therefore supports it reliably.

As an alternative to a polymer cover, the insulator can comprise a sleeve within the cover. Suggested insulators are a polymer or else a metal with a low thermal conductivity, for example V2A.

For this purpose, the sleeve can border the cover at the edge, similarly to a shrunk-on ring. Alternatively, the sleeve encloses only the pressure connection opening.

The various features of novelty which characterize the invention are pointed out with particularity in the claims annexed to and forming a part of the disclosure. For a better understanding of the invention, its operating advantages, and specific objects attained by its use, reference should be had to the drawing and descriptive matter in which there are illustrated and described preferred embodiments of the invention.

BRIEF DESCRIPTION OF THE DRAWINGS

In the drawings, wherein like reference characters denote similar elements throughout the several views:

FIG. 3 is a characteristic curve showing the force characteristic of the pressure-dependent valve as a function of valve travel.

DETAILED DESCRIPTION OF THE PRESENTLY PREFERRED EMBODIMENTS

Figure 1:
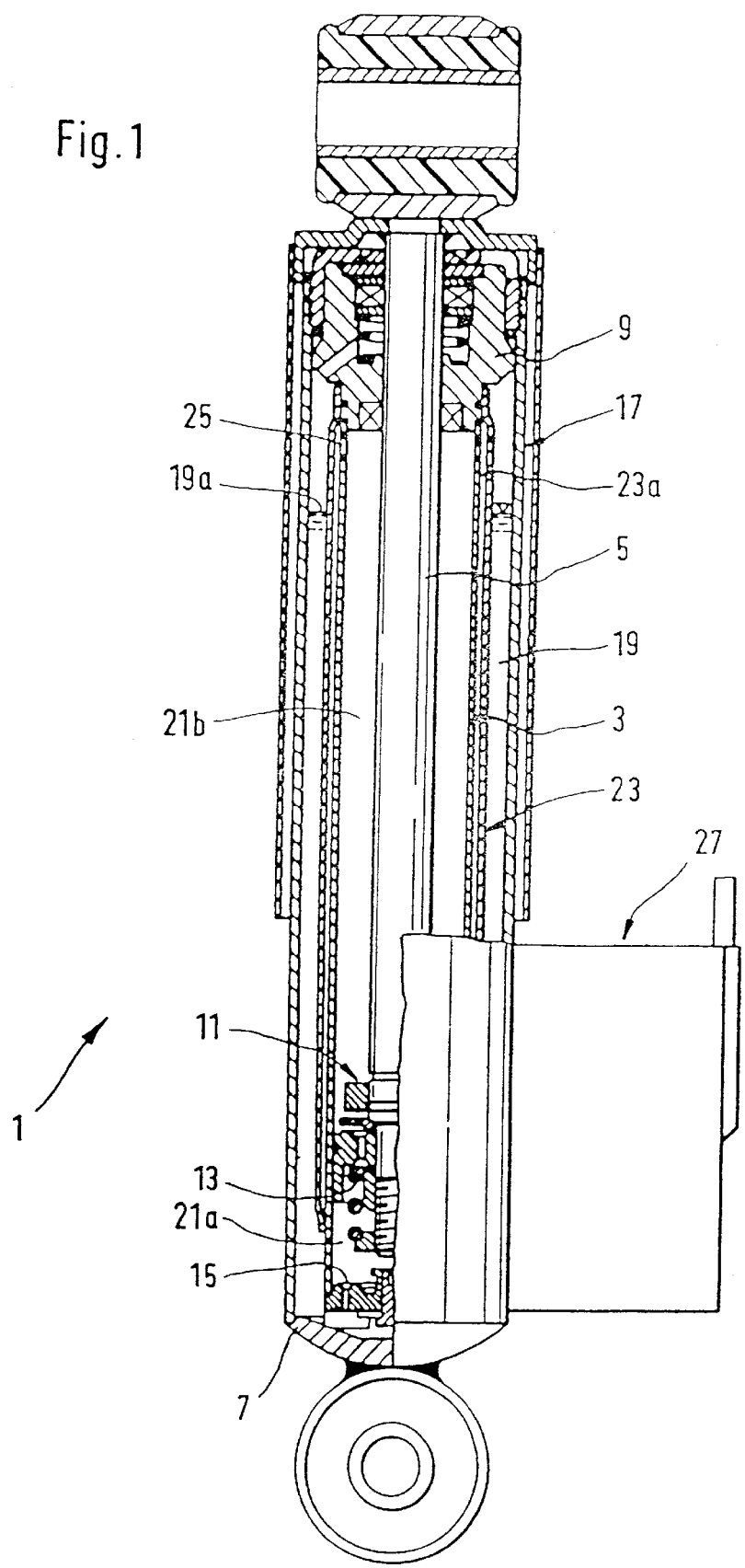
FIG. 1 is a partial longitudinal sectional view of a vibration damper with a pressure dependent valve according to an embodiment of the present invention.

FIG. 1 illustrates a vibration damper 1 having a cylinder 3 in which a piston rod 5 is arranged so as to move axially. The cylinder 3 is closed off at the bottom by a base 7. The piston rod 5 exits the upper end of the cylinder through a guiding and sealing unit 9. Within the cylinder 3, a piston unit 11 having a piston valve arrangement 13 is fixed to the piston rod 5. The base 7 of the cylinder 3 comprises a bottom valve arrangement 15. The cylinder 3 is covered by a container tube 17. An annular chamber is formed between the container tube 17 and the cylinder 1 which represents a balancing chamber. The space within the cylinder 3 is subdivided by the piston unit 11 into a first working chamber 21a and a second working chamber 21b. The first and second working chambers 21a and 21b are filled with pressurized liquid. The balancing chamber 19 is filled up to a level 19a with liquid and above this is filled with gas. Within the balancing chamber 19, a first line section, namely a high-pressure partial section 23a, is formed by an intermediate tube 23, which is connected to the second working chamber 21b via a hole 25 in the cylinder 3. The high-pressure partial section 23a is adjoined by a valve 27 which is pressure dependent and is fitted to the side of the container tube 17. From the valve 27, a second line section (not illustrated), namely a low-pressure partial section, leads to the balancing chamber 19.

When the piston rod 5 moves upward out of the cylinder 3, the size of the upper working chamber 21b decreases. A positive pressure is formed in the upper working chamber 21b, and can be dissipated through the piston valve arrangement 13 into the lower working chamber 21a, provided the valve 27 is closed. If the valve 27 is open, then liquid also flows from the upper working chamber 21b into the balancing chamber 19 via the high-pressure partial section 23 and the valve 27. The damping characteristic of the vibration damper as the piston rod 5 moves out therefore depends on whether the valve 27 is open or closed.

When the piston rod 5 moves into the cylinder 3, a positive pressure is formed in the lower working chamber 21a. Liquid may then be transferred from the lower working chamber 21a into the upper working chamber 21b via the piston valve arrangement 13. The liquid expelled by the increasing piston rod volume within the cylinder 3 is driven out into the balancing chamber 19 through the bottom valve arrangement 15. Since the flow resistance of the piston valve arrangement 13 is lower than the flow resistance of the bottom valve arrangement 15, a rising pressure likewise occurs in the upper working chamber 21b. This rising pressure may flow over into the balancing chamber 19 via the high-pressure partial section 23a, if the valve 27 is open. Accordingly, when the valve 27 is open, the vibration damper 1 has a softer characteristic, even when the piston rod moves in. The shock absorber has a harder characteristic when the valve is closed, in exactly the same way as when the piston rod moves out. It should be noted that the flow direction through the high-pressure partial section 23a of the bypass is always the same, irrespective of whether the piston rod moves in or out.

Figure 2:
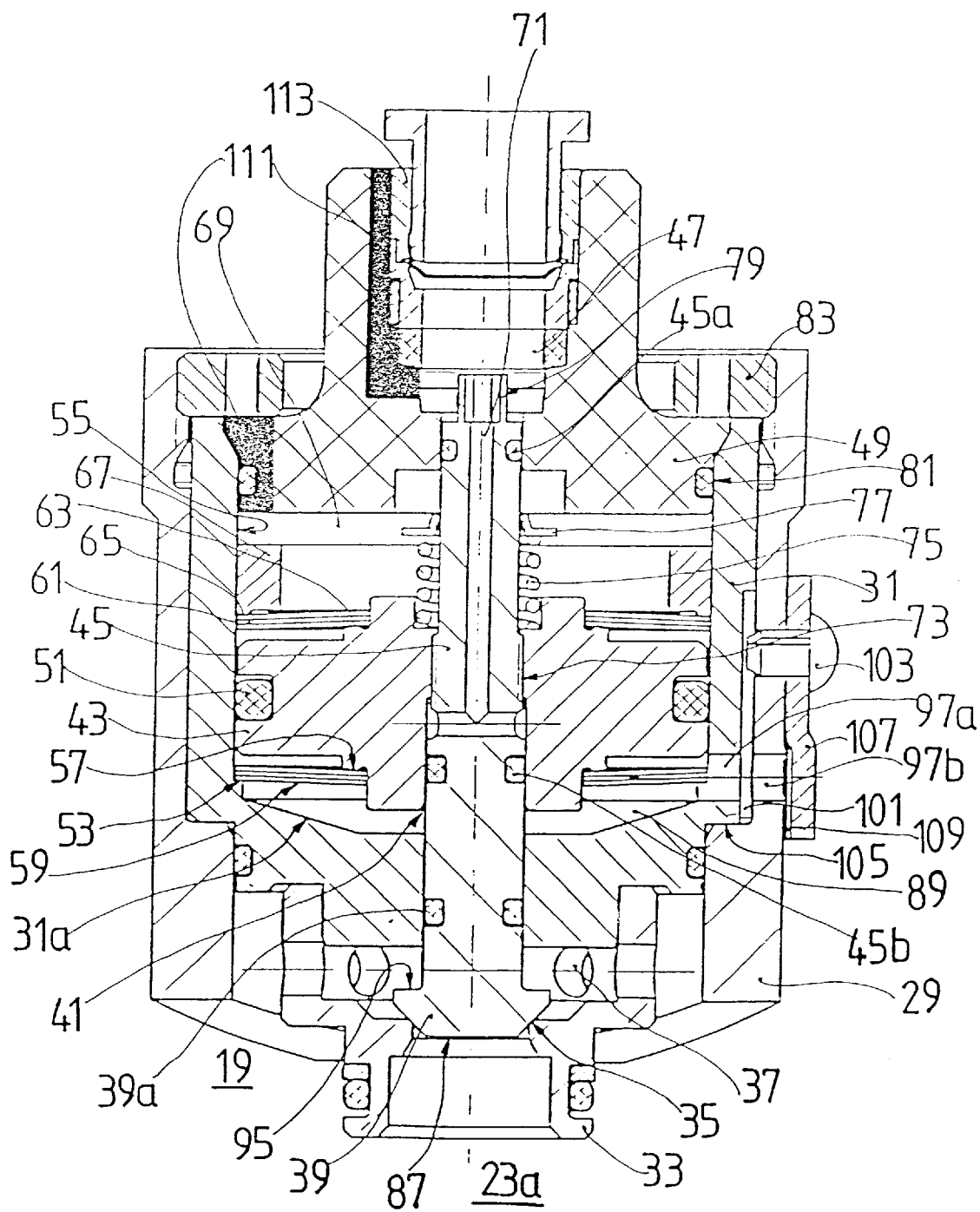
FIG. 2 is a longitudinal sectional view of the valve in FIG. 1.

FIG. 2 shows an embodiment of the pressure-dependent valve 27 as a single component. The valve 27 includes a tubular connecting piece 29 arranged on the outside of the container tube 17. A pot-like insert 31 is mounted within the tubular connecting piece 29 and has a connection 33 to the high-pressure partial section 23a of the vibration damper. A valve face 35 and at least one outflow opening 37 to the balancing chamber 19 are incorporated at the bottom of the connection 33.

In this operating position, a valve body 39 is prestressed against the valve face 35. The valve body 39 is guided radially in a central passage opening 41 in a pressure intensifier 43 with a valve-body seal 39a separating the bottom side of the valve body from the upper side of the valve body. An extension 45 has a bottom end which adjoins the valve body 39 in the central passage opening and a top end which is arranged in a cover 49 in a pressure connection opening 47. The extension passes completely through the pressure intensifier 43. The pressure connection opening 47 is connected to a pressure source (not illustrated) such as, for example, an air spring.

The pressure in the pressure connection opening 47, referred to below as the control pressure, acts on the pressure intensifier 43, which is guided so as to float axially in the pot-like insert 31. The pressure intensifier 43 is formed by a disk with a seal 51 on its outer diameter. For this purpose, starting from the cover 49, the inner diameter of the cylindrical portion of the pot-like insert 31 is machined as a guide face 55 up to a first supporting face 53.

A radially outer side of a first spring element 59 is arranged on the first supporting face 53 of the pot-like insert and a radially inner side of the first spring element is arranged on a shoulder 57 on the underside of the pressure intensifier 43. The first spring element 59 preferably comprises layered flat shims. A second spring element 61 is clamped between a further shoulder 63 on the pressure intensifier 43 and a second supporting face 65 of the pot-like element 31. The second supporting face 65 is arranged on a clamping ring 67 having an outer diameter dimensioned in relation to the guide face 55 such that there is a press fit between the clamping ring and the guide face 55.

A high-pressure chamber 69 is formed between the pressure intensifier 43 and the cover 49 via the guide face 55 and the seal 51 of the pressure intensifier 43 in which the control pressure prevails. From the pressure connection opening 47, the control medium does not pass directly into the high-pressure chamber 69 because a seal 45a isolates the extension 45 on the outside from the pressure connection opening 47. The extension 45 has a central throttling feed channel 71, which extends from the upper end of the extension approximately as far as the valve body 39. From there, the pressure medium may flow through a narrow gap between the pressure intensifier 43 and the extension 45 as far as a threaded connection 73, which forms an adjusting device. The threaded connection 73 constitutes a continuation of the throttling feed channel 71. A further seal 45b prevents compressed-air leaks from the high-pressure chamber to a low-pressure chamber 89 arranged between the lower end of the pressure intensifier 43 and the bottom of the pot-like element 31.

In order for the adjusting device or the threaded connection 73 to operate without play, a prestressing spring 75 is arranged between the extension 45 and the upper side of the pressure intensifier 43. This prestresses the two aforementioned components of the threaded connection such that the same threaded flanks are always engaged. A supporting disk 77 is arranged on the extension 45 as a stop for the prestressing spring 75.

During assembly, a number of flat shims for the first spring element 59 are placed onto the first supporting face 53 in the pot-like insert 31. The pressure intensifier with the seal 51 is then inserted into the pot-like insert 31. The extension 45 of the valve body 39 is then screwed through the insert into the pressure intensifier 45. The connection 33 is subsequently pressed at the end onto the pot-like insert 31. In a further operation, the second spring element 61 is placed onto the shoulder 63. To adjust the setting of the springs, the lower subassembly prepared in this way is clamped into a device which applies a periodically rising force to the valve body from below. The introduction of force to the valve body 39 may be effected mechanically via a plunger or hydraulically or pneumatically via a pressure medium.

For a specific valve setting, a defined opening force should be applied to the valve body 39. At the same time, the pressure intensifier 43 is pressed down via the inserted clamping ring 67 and the second spring element 61. Once the required force gradient on the pressure intensifier 43 has been reached, then the means for introducing force onto the valve body 39 and the pressure intensifier 43 can be switched off. The spring elements have therefore been set to the required spring rate. As a result of its press fit in relation to the guide face 55, the clamping ring maintains the set position of the spring elements. Tolerances on the spring elements, the shoulders on the pressure intensifier and the like are compensated for by this type of adjustment.

After this, the prestressing spring 75 with the supporting disk 77 has to be assembled. In a further operating step, the position of the valve body 39 relative to the pressure intensifier 43 is fixed by the adjusting device 73, to set a valve passage cross section between the valve body 39 and the valve face 35. The valve body may be arranged so that there already is a valve passage cross section. Alternatively, in the opening direction the valve body 39 may rest without force on the valve face 35 or, by means of an adjusting movement, in which the valve body is unscrewed from the pressure intensifier, a prestress may act on the valve body. For the adjustment movement, the extension 45 has at least one tool face 79 at its end. Using the adjustment device, an operating point on the force characteristic of the pressure intensifier may be set.

FIG. 3 is intended to illustrate the difference from the prior art. The dash-dotted characteristics represent typical spring characteristics of disk springs. There is a forced relationship between spring force and valve passage cross section or, respectively, the travel $s_v$ of the valve body. It is therefore possible to achieve only the dash-dotted characteristics, these also being quite substantially subject to tolerances.

With the different prestressing of the first and second spring elements, different slopes in the closing forces $F_s$ are achieved. The adjusting device permits displacement of the operating point, for example of the opening point of the valve body from the valve face on a straight line in the characteristic map. It is therefore also possible for an operating point in the third quadrant of the characteristic map to be set, at which the valve body is already lifted off the valve face by the spring elements, even without any introduction of force to the valve body. The closing forces $F_s$ represent the resulting forces which act on the pressure intensifier 43, specifically the control force acting in the closing direction in the pressure chamber, and the prestressing force of the second spring element minus the opening force of the first spring element. The horizontal axis of the force diagram represents the travel of the pressure intensifier/valve body unit, the origin marking the state in which the valve body rests on the valve face without any closing force.

For the further description, reference is made again to FIG. 2. Once the force adjustments on the structural unit previously described have been concluded, then the pot-like insert 31 is inserted into the tubular connecting piece 29. The cover 49, with its cover seal 81 on the outside, is then pushed into the tubular connection piece 29 until the cover 49 rests on the pot-like insert 31. The cover seal 81 seals off the pressure chamber 69 from the environment in the area of the valve 27. A cover securing ring 83 holds the cover in the inserted position. The cover itself is rotatable so that a supply line (not illustrated) may be aligned in a desired position in relation to the valve 27.

During the operation of the damper 1, damping liquid is displaced via the high-pressure partial section 23a into the connection 33 of the valve 27. Depending on the desired damping force characteristic, the damping medium encounters an inflow face 87 of the valve body 39. The pressure on the inflow face, multiplied by its area, constitutes an opening force which is effective on the valve body 39 and which acts counter to the resulting closing force. The control pressure in the pressure chamber 69 on the pressure intensifier 43 and the resulting spring force of the two spring elements 59, 61 combine to create the closing force. If the opening force is greater than the closing force, the valve body lifts, or a valve body which is already open and already permits a valve passage cross section in the unpressurized state, lifts further. The damping medium can flow into the balancing chamber 19 via the outflow openings 37.

Although a steady-state pressure based on a gas prestress in the vibration damper also acts on the inflow face 87 of the valve body, it also acts at the same time on a rear side 95 of the valve body, so that only the differential area comprising the inflow area minus the rear side of the valve body remains as the active area for the steady-state pressure. Given an appropriate difference in size between the face to which pressure is applied in the pressure chamber for the pressure intensifier and the faces to which pressure is applied on the valve body, the influence of the steady-state pressure can be neglected.

The previous description relates to the ideal case. However, it is not possible to rule out the situation in which the seals 51 in the pressure intensifier and the seal 45b in the extension of the valve body no longer fulfill their required sealing function. To prevent a leak from the high-pressure chamber 69 into the low-pressure chamber 89 from exerting any opening force on the pressure intensifier or the valve body, the low-pressure chamber has a vent connection 97 between the low-pressure chamber 89 and a lower pressure level, as a rule the atmosphere surrounding the valve. The vent connection comprises sections 97a, 97b respectively arranged in the pot-like insert 31 and in the tubular connecting piece 29. When the tubular connecting piece 29 is being welded onto the container 23, attention is already paid to the oriented installation position of the tubular connecting piece 29, where the welding device has a positioning pin that engages in the section 97b. This is so that the section 97b emerges from the tubular connecting piece at the underside and therefore at the lowest point when a vibration damper is essentially vertical.

It is also necessary for the pot-like insert 31 to be installed in a circumferentially aligned position. For this purpose, the pot-like insert 31 has an installation orientation marking in the form of a groove 101 that extends axially and in which an anti-rotation device designed as a pin 103 engages. During assembly, incorrect installation position of the tubular connecting piece 29 is detected immediately, since a holding face 105 of the pot-like insert 31 comes to rest on the pin 103 and cannot be inserted deeply enough into the tubular connecting piece 29. The insert is rotated until the pin 103 engages in the groove 101 and further insertion is possible.

As a second function, the pin 103 undertakes to retain an inflow restrictor 107. In this case, the inflow restrictor comprises a cap, which is angled and therefore only partly covers the vent connection 97. A radial flow path 109 is still available. In any case, the direct penetration of spray water or dust into the low-pressure chamber is effectively prevented. However, it is not possible to rule out water condensing out of the air or spray water penetrating, which likewise collects in the low-pressure chamber 89. As a result of a funnel-like widening 31a of the wall of the base of the pot-like insert 31, any water which makes its way into the low pressure chamber likewise flows into the open air out of the valve 27 via the vent connection 97. If the inflow restrictor 107 is formed by a notched nail or a clamping pin, this has at least a groove or a slot which, in some sections, extends essentially axially. This slot is completely sufficient to vent the low-pressure chamber. In addition, the groove or the slot may be aligned such that it is very unlikely that moisture will penetrate into the valve. It is then possible to dispense with a separate inflow restrictor 107.

During operation of the vibration damper 1, the container tube 17 and therefore also the tubular connection piece may heat up to a very great extent. The steel parts conduct the heat as far as the cover 49 resulting in high thermal loading of a plastic supply hose (not illustrated) and a plug-in sleeve 113 for the plastic hose (preferably produced from a polymer). To reduce this thermal loading, the cover 49 comprises a thermal insulator 111, which may be arranged at any desired point between the tubular connecting piece 29 and the pressure connection opening 47. Two preferred installation locations for the insulator 111 are illustrated in the left-hand half of the cover. It is possible for the insulator 111 to be drawn onto the cover 49 in the manner of a tire. The insulator 11 may comprise a polymer or any other poorly conducting material. Alternatively or in addition, the insulator 111 may also be arranged in the area of the plug-in sleeve 113 for the supply hose. In both cases, the transfer of heat to the plug-in sleeve 113 is at least reduced.

Instead of using a separate insulator 111, the cover 49 may comprise a poorly thermally conducting material, preferably a polymer, for example PPS. In the high-pressure chamber, a control pressure prevails, and of course also loads the cover 49. For this reason, the cover securing ring 83 comprises a relatively large annular surface, to support the cover 49 against compressive forces. The cover securing ring 83 prestresses the cover 49 onto the pot-like insert 31, but also prestresses the pot-like insert 31 over the holding face 105 in the tubular connecting piece 29, so that the pot-like insert 31 is fixed in the tubular connecting piece 29 without play.

The invention is not limited by the embodiments described above which are presented as examples only but can be modified in various ways within the scope of protection defined by the appended patent claims.

We claim:

1. A pressure operated valve for use with a vibration damper comprising a piston rod and a cylindrical tube filled with a damping liquid, wherein said piston rod is axially movably arranged in said cylindrical tube, said pressure operated valve comprising:

an adjusting device axially movably arranged in a pressure chamber defined in said valve, wherein said adjusting device comprises a valve body and a pressure intensifier;

a valve face arranged at a fixed location relative to said pressure chamber, said valve body being movably relative to said valve face, wherein a space between said valve body and said valve face defines a valve passage cross section;

a spring operatively arranged for holding said pressure intensifier in a floating arrangement in said pressure chamber, said valve further defining a pressure connection opening in said pressure chamber, said pressure intensifier having a first side exposed to a pressure in said pressure connection opening and a second side facing away from said pressure connection opening, wherein said second side of said pressure intensifier adjoins a low pressure chamber within said pressure chamber;

a vent connection comprising an inflow restrictor arranged between said lower pressure chamber and a space having a lower pressure than said low pressure chamber; and a pressure connection to said valve having a thermal insulator arranged between said pressure connection opening and said pressure connection.

2. The valve according to claim 1, and further comprising:

a tubular connecting piece that accommodates said valve; and an insert arranged inside the tubular connecting piece and defining the low pressure chamber for guiding the pressure intensifier axially in the tubular connecting piece, wherein said vent connection extends from said low pressure chamber through said insert and said tubular connecting piece to said space having a lower pressure than said low pressure chamber.

3. The valve according to claim 2, and further comprising:

an installation orientation marking in said insert for aligning said vent in said insert with said vent connection of said insert and said tubular connecting piece so that they overlap.

4. The valve according to claim 3, and further comprising:

an anti-rotation device on an interior of said tubular connecting piece being aligned radially inward toward said insert for engaging said installation orientation marking.

5. The valve according to claim 4, wherein said anti-rotation device is a pin that passes through said tubular connecting piece.

6. The valve according to claim 5, wherein said inflow restrictor is a cap and said pin is used to fix said inflow restrictor to said valve.

7. The valve according to claim 4, wherein said installation orientation marking is formed by an axial groove.

8. The valve according to claim 1, wherein said thermal insulator is a sleeve within said cover.

9. The valve according to claim 8, wherein said sleeve borders said cover at an edge.

10. The valve according to claim 8, wherein said sleeve encloses said pressure connection opening.

11. The valve according to claim 1, wherein said thermal insulator is formed by a cover that closes said valve.

12. The valve according to claim 11, wherein said cover consists of a polymer.

13. The valve according to claim 11, wherein said cover is fixed by a cover securing ring.

14. The valve according to claim 1, wherein the inflow restrictor comprises a cap.

15. The valve according to claim 1, wherein said vent connection is arranged substantially at a low point of said valve.

16. The valve according to claim 1, wherein said insert has a base with a wall that widens like a funnel.

* * * * *

UNITED STATES PATENT AND TRADEMARK OFFICE
CERTIFICATE OF CORRECTION

PATENT NO. : 6,305,512 B1
DATED : October 23, 2001
INVENTOR(S) : Norbert Heinz

Page 1 of 1

It is certified that error appears in the above-identified patent and that said Letters Patent is hereby corrected as shown below:

<u>Title page,</u>
The Fifth Inventor's name is: Thorston Asshoff

Signed and Sealed this

Twenty-first Day of May, 2002

Attest:

Attesting Officer

JAMES E. ROGAN
*Director of the United States Patent and Trademark Office*

UNITED STATES PATENT AND TRADEMARK OFFICE
CERTIFICATE OF CORRECTION

PATENT NO.   : 6,305,512 B1
DATED        : October 23, 2001
INVENTOR(S)  : Norbert Heinz It is certified that error appears in the above-identified patent and that said Letters Patent is hereby corrected as shown below:

<u>Title page,</u>
The Fifth Inventor's name is: Thorsten Asshoff

This certificate supersedes Certificate of Correction issued May 21, 2002.

Signed and Sealed this

Twelfth Day of November, 2002

*Attest:*

*Attesting Officer*

JAMES E. ROGAN
*Director of the United States Patent and Trademark Office*